US010405558B2

(12) United States Patent
Chappell

(10) Patent No.: US 10,405,558 B2
(45) Date of Patent: Sep. 10, 2019

(54) LOIN PULLER SCRIBE SAW ASSEMBLY

(71) Applicant: Hall Fabrication, Inc., Henderson, NV (US)

(72) Inventor: David Chappell, Las Vegas, NV (US)

(73) Assignee: Hall Fabrication, Inc., Henderson, NV (US)

( * ) Notice: Subject to any disclaimer, the term of this patent is extended or adjusted under 35 U.S.C. 154(b) by 723 days.

(21) Appl. No.: 14/950,142

(22) Filed: Nov. 24, 2015

(65) Prior Publication Data

US 2017/0142985 A1 May 25, 2017

(51) Int. Cl.
*A22B 5/00* (2006.01)
*A22C 17/00* (2006.01)
*A22B 5/16* (2006.01)
*B26B 11/00* (2006.01)

(52) U.S. Cl.
CPC ............ *A22B 5/0029* (2013.01); *A22B 5/163* (2013.01); *A22C 17/0006* (2013.01); *B26B 11/00* (2013.01)

(58) Field of Classification Search
CPC ....................................................... A22B 5/00
USPC ................ 452/132, 133, 135, 137, 149, 171
See application file for complete search history.

(56) References Cited

U.S. PATENT DOCUMENTS

| | | | |
|---|---|---|---|
| 3,197,808 A * | 8/1965 | Mears | B26B 25/002 452/171 |
| 3,269,010 A * | 8/1966 | Bettcher | B26B 25/002 30/276 |
| 3,352,011 A * | 11/1967 | Alexander | B26B 3/00 219/241 |
| 4,494,311 A * | 1/1985 | McCullough | B26B 25/002 30/276 |
| 4,509,261 A * | 4/1985 | Bettcher | B26B 25/002 30/276 |
| 4,637,140 A * | 1/1987 | Bettcher | B26B 25/002 30/276 |
| 4,854,046 A * | 8/1989 | Decker | B26B 25/002 452/149 |
| 5,031,323 A * | 7/1991 | Honsa | B25F 5/021 30/276 |
| 5,400,511 A * | 3/1995 | Decker | B26B 25/002 16/430 |
| 5,407,384 A | 4/1995 | Boody et al. | |
| 5,882,252 A | 3/1999 | Boody et al. | |
| 9,321,183 B2 * | 4/2016 | Steele | B26B 25/002 |
| 9,592,076 B2 * | 3/2017 | Esarey | A61B 17/322 |
| 10,039,567 B2 * | 8/2018 | Esarey | A61B 17/322 |

* cited by examiner

*Primary Examiner* — Richard T Price, Jr.
(74) *Attorney, Agent, or Firm* — McKee, Voorhees & Sease, PLC

(57) ABSTRACT

A scribe saw assembly is provided for a loin puller and has substantially reduced wear and increased life of the assembly components. A pinion assembly includes a double keyway and opposing cutouts on the pinion shaft, with dual needle bearings. A bevel gear assembly includes pins for holding the scribe saw blade and dual bearings on the bevel gear shaft to eliminate shaft flex and blade wear. The standard is mounted to the motor housing with load bearing pins to prevent loosening of the mounting bolts. An adjustable ski is provided on the standard to control the cutting depth of the scribe saw blade.

8 Claims, 6 Drawing Sheets

LOIN PULLER SCRIBE SAW ASSEMBLY

FIELD OF THE INVENTION

This invention relates to the meat processing industry, and particularly to a loin puller scribe saw assembly for cutting the loin from the carcass middle.

BACKGROUND OF THE INVENTION

Pork carcasses are typically cut into six initial portions, including the left and right front and hind quarters, and the left and right middles. The loin is part of the middle portion, adjacent the backbone in between the ribs and outer layer of back fat.

The conventional loin puller machine, which separates the loin from the carcass middle, has been substantially unchanged for approximately twenty years. One example of a prior art loin puller is from Acraloc, in Tennesee, as described in their U.S. Pat. No. 5,882,252.

A typical loin puller can process 1,300 pork middles per hour. Cutting accuracy is critical. For example, if a scribe saw cuts into the rib bone then the primary meat cutting blade cuts through the bone more than one-quarter inch into the belly underneath. That part or the belly, which later becomes bacon, then falls off causing yield loss. If the scribe saw cut is too shallow, when the meat cutting blade tries to pass through the scribe saw blade path, without the bone being cut all the way through. This partial bone cut results in major bone damage, with chips of broken bone distributed throughout the meat.

The pork processing industry has had several long standing problems with conventional loin pullers. In a conventional loin puller, a rotary scribe saw is provided with a ski fixed to the head or standard. The depth of the scribe saw blade cut is controlled by a mutable part system. This system includes a wheel which rides on top of the rib, so as to create a counter resistance to the air cylinder that also brings the scribe saw downward into the rib bone. This air regulation of the cutting depth is inconsistent due to temperature variations in the carcass. A problem arises since the meat product temperature changes throughout the day. Soft product will cause the depth control wheel to sink in, letting the sscribe saw blade cut too deep. With hard product, the wheel rides on top, with no "give," causing the scribe saw blade to not cut all the way through. Also, the fixed ski on the scribe saw standard limits sharping of scribe saw blade, and thus shortens the life of the blade.

The scribe saw blade on a conventional loin puller is also subject to wear and failure due to loads on the drive shaft. Since the blade operates at approximately 2,000 RPM, wear damage can occur quickly, leading to breakage of the blade. Such excessive wear can be the result of a side load on the drive gear shaft, which deflects the shaft and thereby deflects the blade, which then rubs on the standard. Breakage of the blade is a significant safety hazard.

Another problem with the conventional loin puller is wear and damage to the various shafts. The pinion shaft is connected to a motor drive shaft via a single keyway, which generates pressure on only one side of the motor shaft, which can lead to complete failure of the motor shaft. Also, because the ball bearing between the pinion shaft and motor shaft has very limited contact only at the point where the ball is touching the shafts, the longevity of the bearing, motor shaft, and pinion shaft is compromised.

Conventional loin pullers are also known to lose the mount bolts which mount the scribe saw standard to the motor. The side loads on the assembly tend to loosen the mounting bolts, which can then become lost in the meat product.

The single bearing use in a conventional loin puller also causes the ring or bevel gear and pinion gear to misalign due to flexing, thereby leading excessive wear and breakage of the shafts and/or the scribe saw blade.

Therefore, a primary objective of the present invention is the provision of an improved loin puller scribe saw assembly which overcomes the problems of the prior art.

Another objective of the present invention is the provision of a loin puller scribe saw assembly having an adjustable ski for controlling the depth of the scribe saw cut.

A further objective of the present invention is the provision of a scribe saw assembly for a loin puller having improved bearings to minimize wear and damage, and to increase life of the assembly components.

Still another objective of the present invention is the provision of a scribe saw assembly for a loin puller having load bearing pins to reduce or eliminate transfer of operational loads.

Yet another objective of the present invention is the provision of a loin puller scribe saw assembly having a pinion shaft with a double keyway to enhance tightening of the pinion to the pinion shaft and to equalize pressure on both sides of the motor shaft.

A further objective of the present invention is the provision of a scribe saw assembly for a loin puller which reduces wear and minimizes risk of shaft or blade damage.

Another objective of the present invention is the provision of a scribe saw assembly for a loin puller which increases the life expectancy of the scribe saw blade and other components.

Still another objective of the present invention is the provision of a scribe saw assembly having a machined or cast standard with high tolerances, and with a smoother finish to provide easier cleaning and less bacteria traps.

Another objective of the present invention is the provision of a scribe saw assembly for a loin puller which is economical to manufacture, and simple, safe and durable in use.

These and other objectives become apparent from the following description of the invention.

SUMMARY OF THE INVENTION

The loin puller scribe saw assembly of the present invention includes several improvements over the prior art, both structural and functionally. One improvement is the provision of an adjustable ski for quickly and easily controlling the depth of the scribe saw blade cut. Another improvement is the provision of a double keyway on the pinion shaft to eliminate side pressure on the motor shaft. A pair of needle bearings are also provided on the pinion shaft to increase the contact area to prolong the life expectancy of the bearings, motor shaft, and pinion. A further improvement is the provision of a plurality of pins on the bevel gear to provide constant holding force on the scribe saw blade, and the use of double bearings to provide more contact with the bevel gear shaft. The number of shims or spacers for the bevel gear are reduced, to minimize or eliminate side load on the gear shaft. The scribe saw standard also utilizes load pins to transfer side load from the motor to the pins, rather than to the mounting bolts. The machined standard increases tolerance while enhancing cleaning and minimizing surface bacteria.

DETAILED DESCRIPTION OF THE INVENTION

Figure 1:
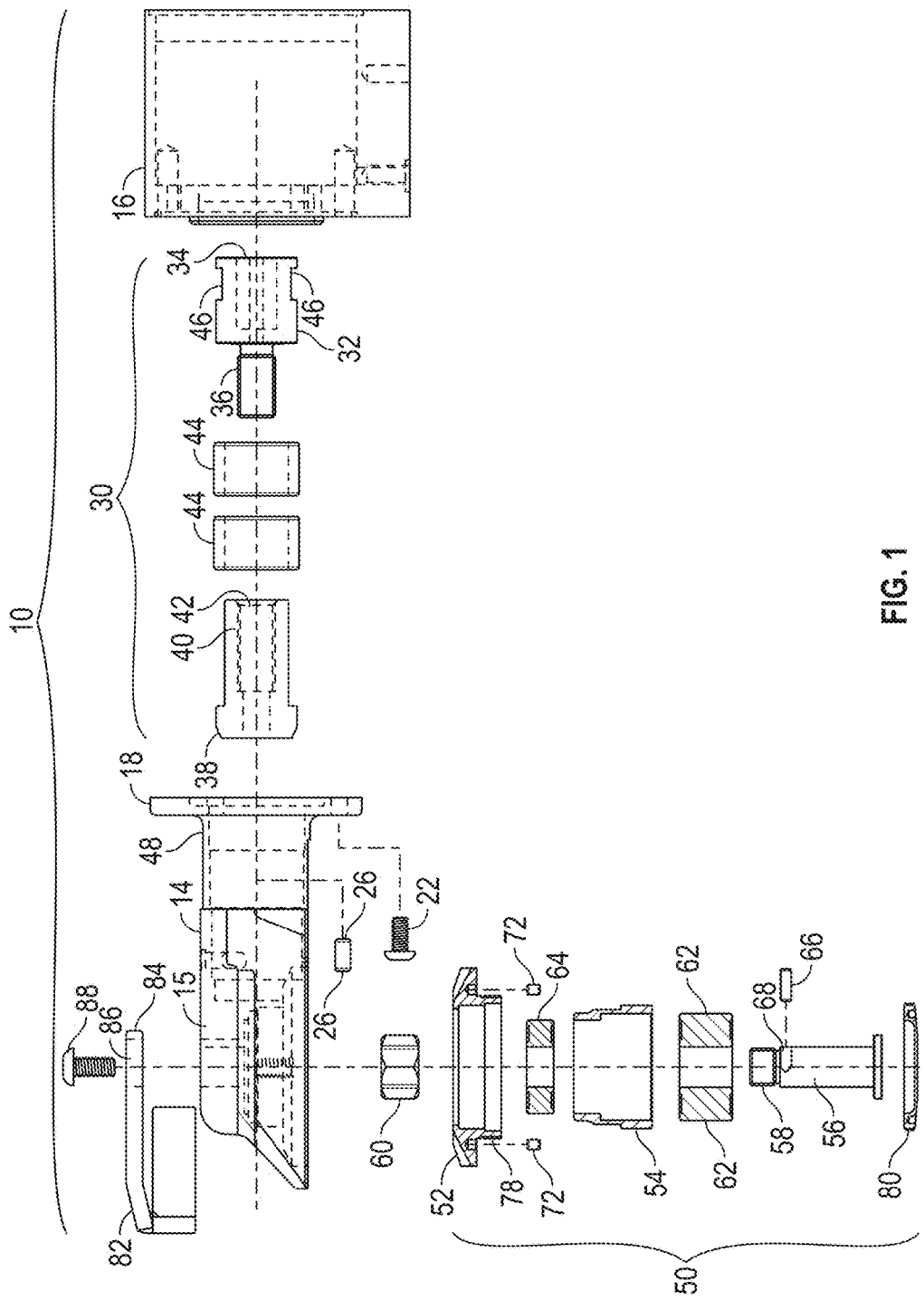
FIG. 1 is an exploded view of the scribe saw assembly of the present invention.
Figure 2:
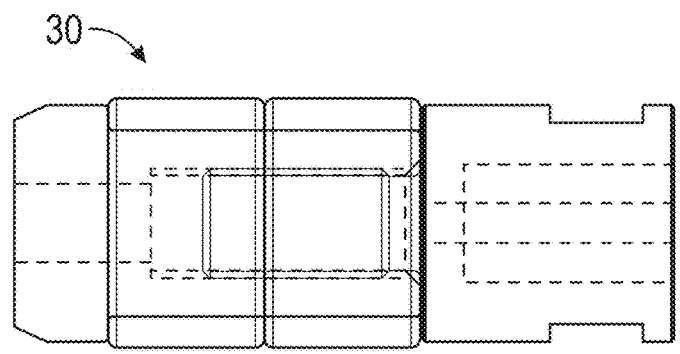
FIG. 2 is a view showing the assembled pinion components of the scribe saw assembly.
Figure 3:
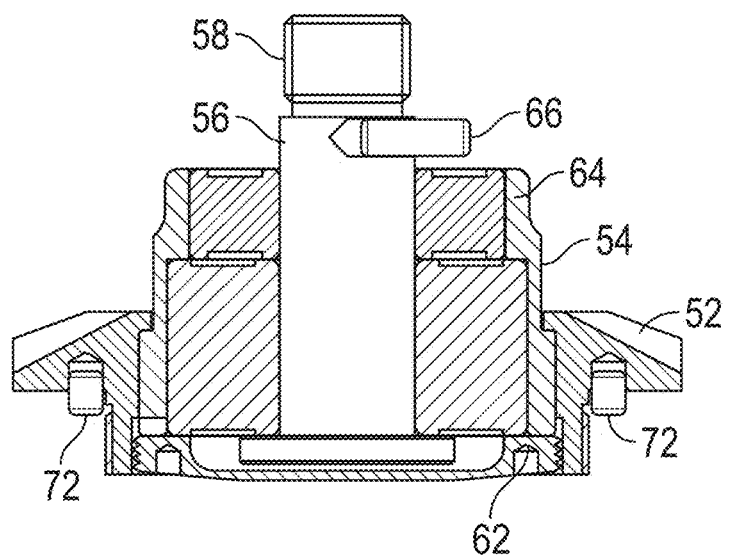
FIG. 3 is an assembled view of the beveled gear components of the scribe saw assembly.
Figure 4:
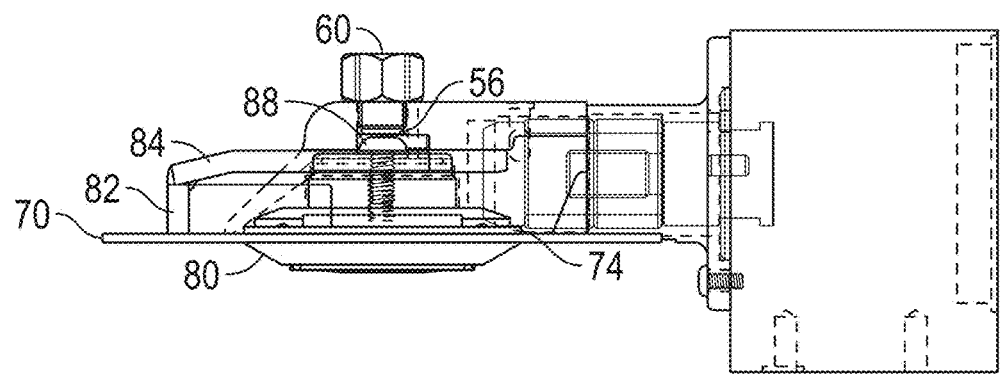
FIG. 4 is a side elevation view of the assembled components of the scribe saw assembly.
Figure 5:
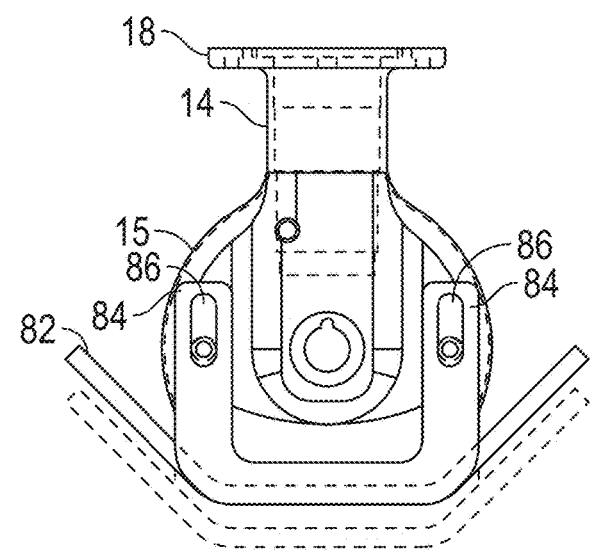
FIG. 5 is a front elevation view of the scribe saw standard with the adjustable ski in a retracted position.
Figure 6:
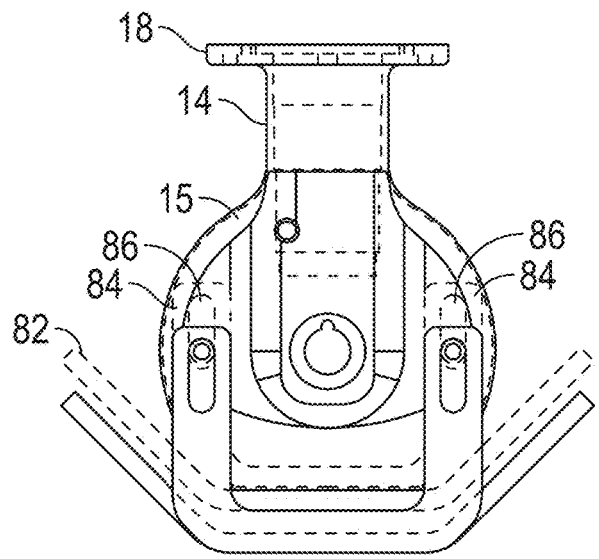
FIG. 6 is a view similar to FIG. 5 with the adjustable ski in an extended position.
Figure 7:
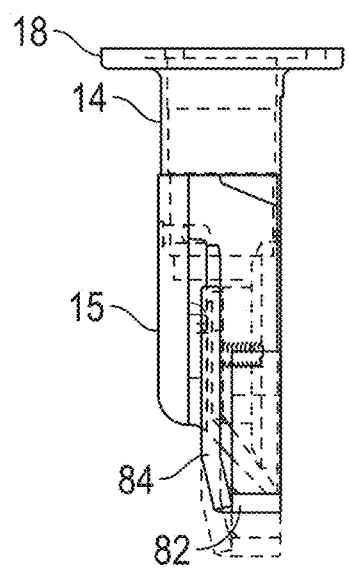
FIG. 7 is a side elevation view of the standard with the adjustable ski in a retracted position.
Figure 8:
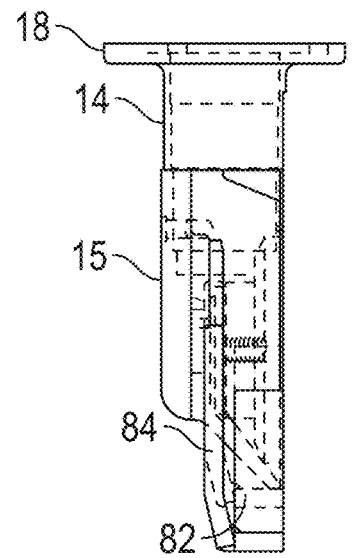
FIG. 8 is a view similar to FIG. 7 with the adjustable ski in an extended position.
Figure 9:
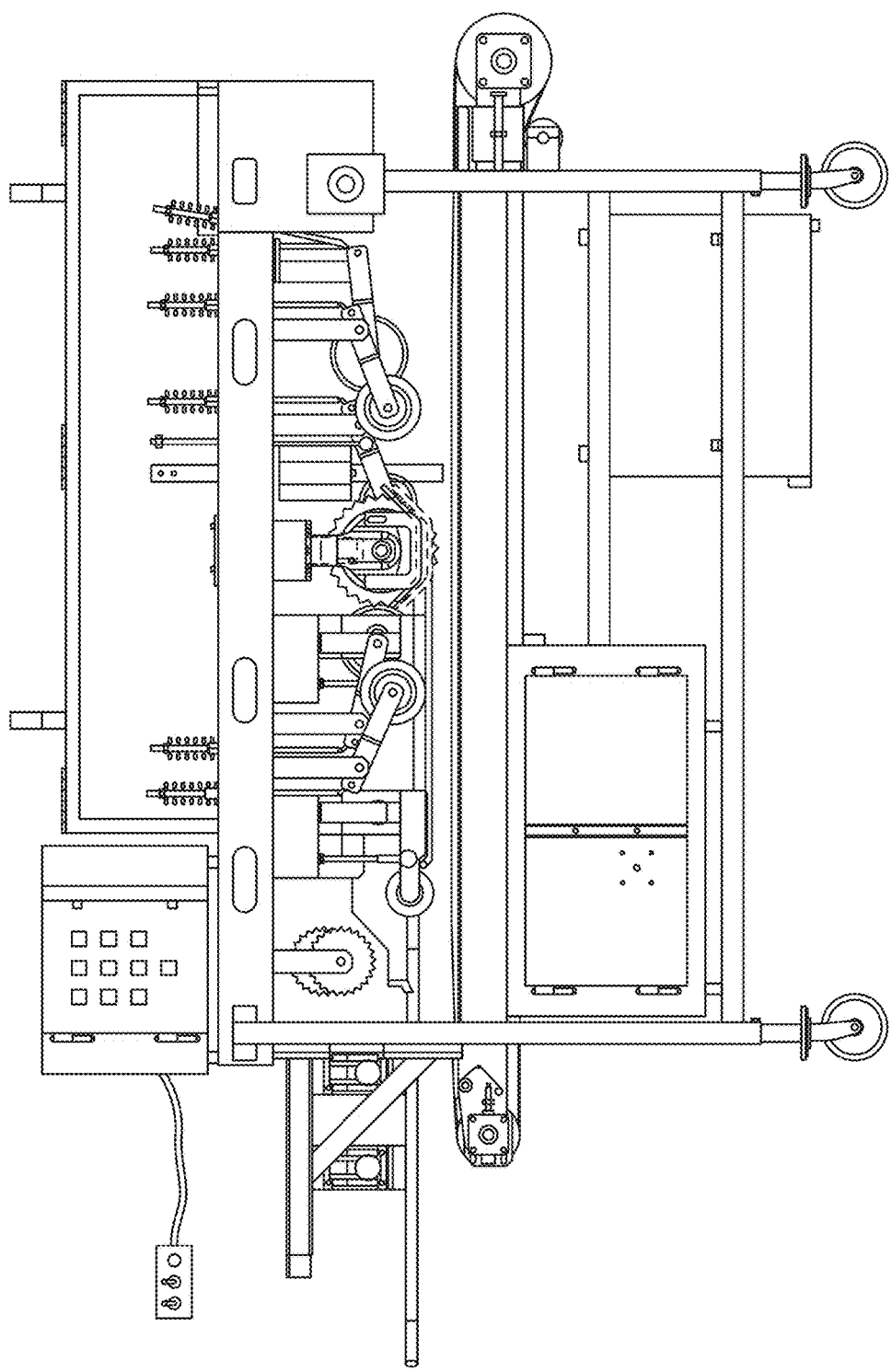
FIG. 9 is a side elevation view of a loin puller machine having the scribe saw assembly of the present invention.
Figure 10:
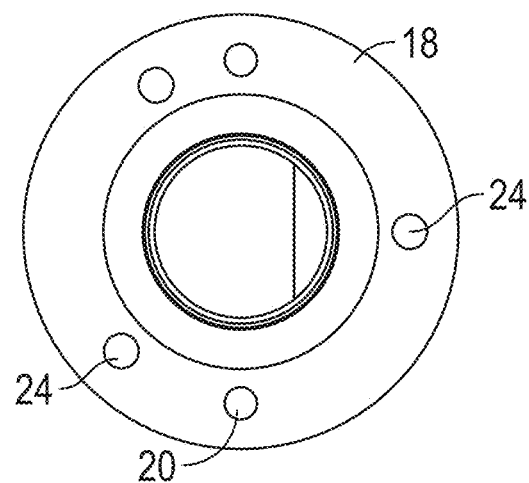
FIG. 10 is an elevation view of the mounting end of the standard of the scribe saw assembly.
Figure 11:
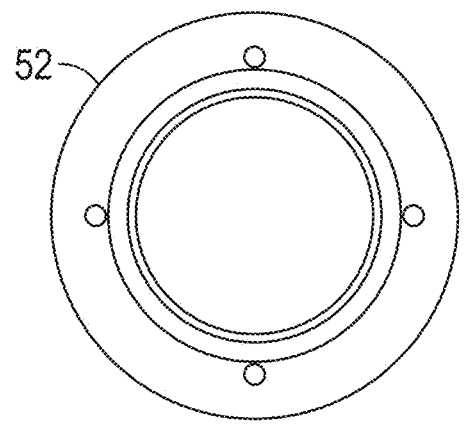
FIG. 11 is an elevation view of one side of the bevel gear of the scribe saw assembly.

The scribe saw assembly of the present invention is generally designated in the drawings by the reference numeral 10. The assembly 10 is part of a loin puller machine 12. The scribe saw assembly 10 has a standard or head 14. The standard 14 is mounted to a motor housing 16 with a motor therein having an output or drive shaft. More particularly, the standard 14 has a circular flange 18 with a plurality of mounting holes 20 for receiving bolts 22 which extend through the flange 18 and into threaded holes in the motor housing 16. The flange 18 also includes a pair of holes 24 through which pins 26 extend into the motor housing 16. The pins 26 prevent operational side loads from transferring to the bolts 22, thereby preventing the bolts from loosening and becoming lost during operation of the loin puller 12.

A pinion assembly 30 is adapted to receive the motor drive shaft. The pinion shaft 32 also has an output shaft 36 upon which a pinion gear 38 is mounted. The body 40 of the pinion gear 38 has an internal bore 42 to receive the output shaft 36. A pair of needle bearings 44 are mounted on the pinion body 30. The use of the needle bearing 44 on the pinion shaft 32 provides contact substantially along the full length of the needle, as opposed to a line contact provided by prior art roller bearings. Thus, the needle bearing provides approximately one hundred times more contact for better control of the pinion assembly 30, increasing the longevity of the motor shaft, pinion shaft, and bearing.

Pinion assembly 30 extends substantially into the hollow body 48 of the standard 14. The pinion shaft 32 also includes a pair of external cutouts 36, each of which receive a key for providing a tight fit of the pinion to the pinion shaft 32. This double cutout and key construction allows for equal pressure on both side of the motor shaft, thereby precluding uneven forces on the motor shaft and extending the life of the motor shaft.

A bevel gear assembly 50 is mounted in the standard 14 and generally extends perpendicular to the pinion assembly 30. The bevel gear assembly 50 includes a bevel gear 52 mounted on a bushing 54, and a shaft 56 extending through the gear 52, bushing 54, and the standard 14. The end 58 of the shaft 56 is threaded, and extends beyond the back wall of the standard 14 to receive a retaining nut 60. The shaft 56 extends to a first bearing 62 fit within the bushing 54, and a second bearing 64 fit within the standard 14. The shaft 56 is locked to the standard 14 by a pin 66 to prevent rotation of the shaft 56. The pin 66 extends into a transverse hole 68 in the shaft 56, with the outer end of the pin 66 being received in a slot or notch formed in the back wall of the standard 14.

The gears 62, 64, which reside within the bushing 54, provide substantial contact with the gear shaft 56, without the use of a conventional spacer. This construction minimizes or eliminates side loads on the gear shaft 56, and thereby prevents deflection of the shaft 56, which would otherwise be transferred to the scribe saw blade 70.

The scribe saw blade 70 is mounted to the bevel gear 52 via four pins 72 press fit into holes or sockets in the front face of the bevel gear 52. The pins 72 provide constant holding power for the blade 70. A grease shield 74 may reside between the blade 70 and the bevel gear 52 to seal the bevel assembly 50 against exterior contamination. A blade nut 76 is threadably mounted on the bevel gear ring 78 to retain the blade 70 on the bevel gear assembly 50. The ring 78 includes internal threads for threadable coupling of a bear lock nut 80.

The depth of cut of the blade 70 is controlled by an adjustable ski 82 mounted on the standard 14. In a preferred embodiment, the ski 82 has a mounting bracket comprised of a pair of arms 84 each having a slot 86 therein. A bolt 88 extends through each of the slots 86 and into the back of the standard 14. The vertical position of the ski 82 can be adjusted by loosening the bolts 88 and sliding the ski arms up or down via the slots 86 to a desired position. Then the bolts 88 are re-tightened to maintain the ski 82 in the selected position.

Preferably, the standard 14 is machined so as to produce a smooth finish, as compared to prior art cast standards. The smooth finish makes cleaning easier and minimizes bacteria traps. The back wall 15 of the standard 14 has been increased in thickness by approximately one-half inch, from 0.20" to 0.70".

The addition of a second bearing inside the head of the standard 14 helps maintain proper meshing alignment of the pinion gear 38 with the bevel gear 52, by eliminating flex which is otherwise present with only a single bearing. Thus, the double bearing bevel gear assembly 50 minimizes wear on the blade 70 and eventual failure of the blade 70, which is a significant safety risk.

The invention has been shown and described above with the preferred embodiments, and it is understood that many modifications, substitutions, and additions may be made which are within the intended spirit and scope of the invention. From the foregoing, it can be seen that the present invention accomplishes as least all of its stated objectives.

What is claimed is:

1. A loin puller scribe saw assembly, comprising:
   a standard to drivingly support a scribe saw rotary blade;
   a rotary scribe saw blade mounted on the standard for cutting a carcass middle; and
   a ski slidably mounted on the standard to permit adjustment of the blade cutting depth.

2. The assembly of claim 1 with the ski includes a mounting bracket having at least one vertical slot, and a bolt extending through the slot and into the standard for adjusting the Ski position relative to the blade.

3. The assembly of claim 1 further comprising a motor operatively connected to the blade for rotating the blade.

4. The assembly of claim 3 further comprising a pinion gear and a bevel gear meshingly mounted in the standard, with the motor drivingly connected to the pinion gear and the blade drivingly connected to the bevel gear.

5. The assembly of claim 3 further comprising a shaft interconnecting the bevel gear and the blade, and a pair of bearings on the shaft to eliminate shaft deflection.

6. The assembly of claim 3 further comprising a shaft interconnecting the pinion gear and the motor, with a double key slot on the shaft to equalize pressure on both sides of the shaft.

7. The assembly of claim 3 further comprising a shaft interconnecting the pinion gear and the motor, with a pair of needle bearings on the shaft to provide shaft contact along the length of the bearings.

8. The assembly of claim 1 wherein the standard has a plurality of mounting screws and a pair of load bearing pins to preclude transfer of side loads to the mounting screws.

\* \* \* \* \*